June 4, 1963            G. ULSH            3,091,885
RELEASABLE FISH HOOK
Filed July 13, 1960
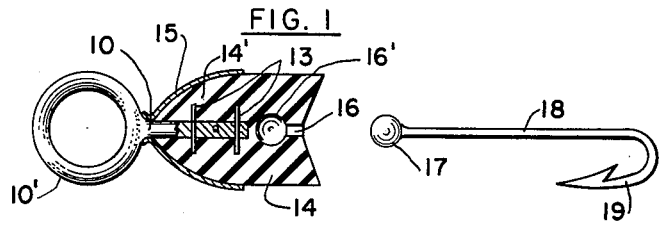
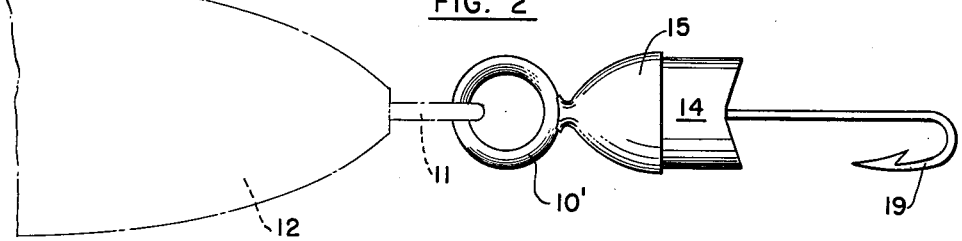
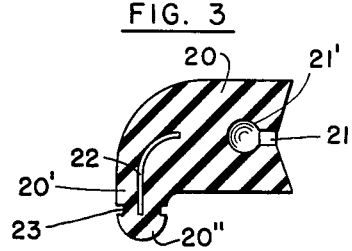
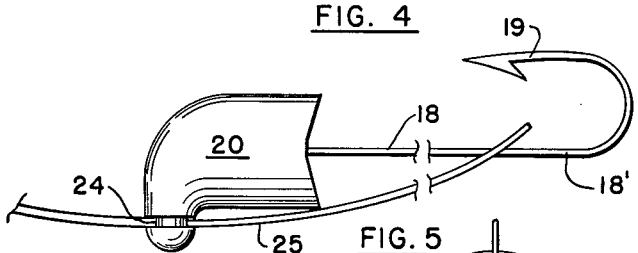
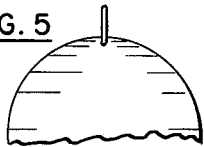
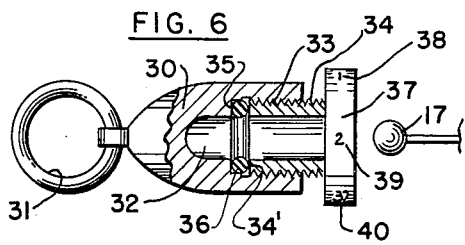
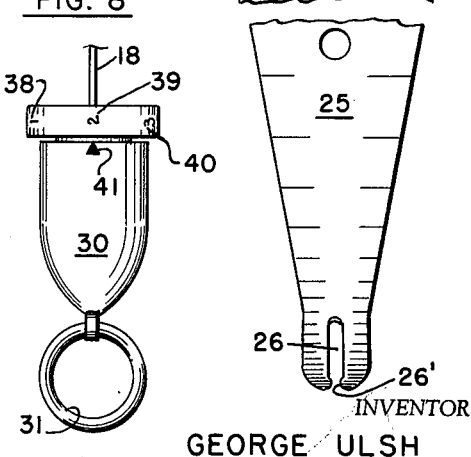
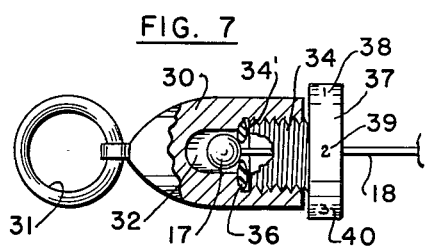
INVENTOR
GEORGE ULSH
BY     *J. Wesley Everett*
ATTORNEY U## nited States Patent Office 3,091,885
Patented June 4, 1963

3,091,885
RELEASABLE FISH HOOK
George Ulsh, 7343 Windsor Mill Road at Rolling Road, Baltimore, Md.
Filed July 13, 1960, Ser. No. 42,606
1 Claim. (Cl. 43—42.52)

The present invention relates to a device for releasing fish hooks from the fishing line, or artificial bait such, as a plug or spoon, as the case may be.

The primary object of the invention is to release the hook that may get caught on some object while fishing and save the line and bait by allowing the hook to become disengaged when the pull on the line is above the normal pull for the catching of the fish.

Another object of the invention is to provide such a releasing means that will require a predetermined amount of pull on the hook before its release, which enables the fisherman to recover his line, sinker and bait, whereby his only loss being his hook.

While several objects of the invention have been set forth other objects, uses and advantages will become more apparent as the nature of the invention is more fully disclosed, which resides in its novel feature herein set forth. The invention being illustrated in the accompanying drawings and specifically set forth in the description to follow:

FIG. 1 is a view partly in section and partly in elevation showing the fish hook detached from the hook retaining element.

FIGURE 2 is a view similar to FIGURE 1 showing the hook and the hook retaining element assembled.

FIGURE 3 is a sectional view of a modified form of hook retaining element.

FIGURE 4 is a view in elevation of the form of hook retaining element shown in FIGURE 3 illustrating the manner in which this hook retaining element is secured to an artificial bait, such as a spoon.

FIGURE 5 is a fragmentary view in elevation of the type of artificial bait shown in FIGURE 4.

FIGURE 6 is a sectional view of still a further modified form of hook releasing device.

FIGURE 7 is a sectional view similar to the view shown in FIGURE 6, in which certain members of the device are at different adjusted positions and being assembled with the hook.

FIGURE 8 is a view in elevation of the form shown in FIGURES 6 and 7 illustrating means for estimating the adjustment of the hook retaining element.

In referring to the drawings like reference numerals are used to point out like and similar parts through the several views.

The preferred form of the invention is shown in FIGURES 1 to 4 inclusive.

In FIGURES 1 and 2 the device comprises a rigid stem member or portion 10, which is provided with means for fastening the device to a fishing line or artificial bait. In the present instance the stem is provided with a ring portion 10' which is adapted to engage a line or similar ring member 11 carried on an artificial lure 12. The stem 10 is preferably constructed of metal or other rigid material and is also provided with means 13 for engaging a hook holding or retaining element 14. The engaging means 13 are embedded in the area 14' of the member 14 in which the stem 10 is embedded. There may be a shield 15 for giving strength and rigidity to this area of the member 14. The hook retaining or holding element 14 is constructed of a pliable and elastic material, such as rubber, plastic or the like. The hook holding element 14 is provided with a recess having a channel like opening extending inwardly from its rear outer surface and opposite the stem member 10. The recess extends inwardly from the outer surface of the member 14, as shown at 16, extending inwardly and terminates into a larger cavity 16', which is of such size as to receive an enlarged head member 17 fixedly secured to the outer end of the fish hook shank 18 of the hook 19 allowing the enlarged end of the shank to rest against the inner end of the channel.

The operation of the device being, that the head portion member 17 carried on the shank 18 of the hook is forced through the portion 16 of the opening in the member 14 until it reaches the enlarged cavity 16' where it will rest. The member 17 and the opening 16' are preferably of spherical form, but may be of other sizes and shapes that may produce the same results.

The element 14 is constructed of such elasticity that a predetermined pull on the hook will be required to withdraw the portion 17 from the cavity 16' of the recess. The necessary pull on the hook to afford its release is calculated on the size of the member 17 and the cavity 16' and the elasticity in the member 14 itself, each has its part in calculating the right amount of pull to release the hook. However, it must be kept in mind that the releasing action must be slightly less than the strength of the fishing line in order that, the hook will become disconnected before the line breaks, should the hook get caught on some object while fishing. It must also be understood that the member 14 is designed to grip the member 17 with sufficient firmness as to resist the pull of the fish. Therefore, these devices may be made up of various releasing pulls, to be used with different strength lines, depending upon the type of fish sought.

FIGURES 3 and 4 show a modified form of device 14 which is designated as 20. The recess 21 and 21' is substantially like that described for the recess 16 and 16' in FIGURES 1 and 2. The principal difference in this modification being the right angled portion 20'. This portion is preferably provided with a reinforcing member 22 for reinforcing this reduced portion. The portion 20' is provided with a groove 23 and an outer end portion 20". This outer end portion 20" is adapted to be passable through an aperture 24 of a spoon type bait 25, as shown in FIGURES 4 and 5. When the hook is attached to the spoon as illustrated, the inner end 18' of the shank rests within a slot 26 in the lower end of the spoon. The fishing line is attached to the larger end of the spoon 25 (see FIG. 5) for pulling the spoon through the water. If the hook should be caught on some object, the member 17 of the hook shank will pull from the element 20 when a predetermined pressure is exerted on the line, and the hook shank will slide through the slot and be released as the opening at 26' is of sufficient size as to let the shank of the hook pass through.

A further modified form of device is illustrated in FIGURES 6, 7 and 8. In this form there is provided a rigid shell member 30 having means in the form of a ring 31 for attaching the device to a fishing line, plug etc. The shell member 30 is provided with a recess 32 extending inwardly from the side opposite the ring 31. The portion of the recess adjacent its outer end being threaded at 33 for threadably receiving a screw cap member 34. Adjacent the inner edge of the thread is a shoulder 35. This shoulder is of such size as to receive a predetermined size rubber ring, sometimes referred to as an O ring 36. The opening in the O ring is of such size as to allow the member 17 of the hook shank to slip through with very little pressure so that it will be confined in the portion of the recess adjacent the ring 31 as shown in FIGURE 7. The screw cap member 34 is provided with a shoulder 34' which is adapted to press on one side of the ring 36 and press it against the shoulder 35, causing it to flatten out and narrow its center opening, as shown in FIGURE 7. The more the ring is compressed the narrower will its opening become setting up more friction and making it more difficult for the portion 17 of the hook shaft to pass through the O ring opening. Therefore, by regulating the pressure on the ring, the pull required to release the hook may also be regulated. In order to gauge this pressure a dial is provided on an outer head member 37 which is shown as an integral part of the screw cap 34, by the numerals as shown at 38, 39, 40, which may be compared with the mark 41 carried on the member 30.

While the releasing device is primarily for releasing fish hooks, it may also be equally effective in releasing sinkers or other fishing equipment from the line or from the fishing lure. The releasing device may also take the form of having the elastic holding element carried on the releasable element of the equipment and being releasable with the equipment element such as the hook, sinker etc. that is the holding element is so constructed that it will release itself from the line, plug or lure, or from an element carried by these members to which the elastic holding element is attached.

While several forms of the invention have been described in detail, it is not intended as a limitation and the principle involved is limited only by the prior art, and is more specifically defined in the appended claim.

I claim:

In a fish lure, a holding element for a fish hook having the hook positioned at one end of an elongated shank, the shank having an enlarged circular end portion on the end of the shank opposite the hook, said end portion being substantially larger than the shank, the holding element comprising, a unitary body portion of a pliable rubber-like material of predetermined elasticity having a channel-like aperture of substantially the same diameter as the shank and of smaller diameter than the enlarged end portion of the shank extending through one end and into the interior of the body portion, the holding element having a cavity therein of larger diameter than the channel and connected with the inner end of said channel to form a continuous circular shoulder about the inner edge of the channel, the cavity being of substantially the same diameter as the diameter of the enlarged end of the shank and adapted to receive the same in a position to allow the enlarged end of the shank to rest against the shoulder formed by the inner end of the channel until an outward pull on the hook shank creates sufficient stress to expand the area of the pliable holding element surrounding the channel, the end of the holding element opposite the end carrying the channel opening being formed at an angle to the elongated axis of the channel and having a groove positioned inwardly from and adjacent the outer end thereof, and a thin spoon type fish bait having an aperture therethrough of substantially the same diameter as the groove and adapted to receive the outer end of the angled portion of the holding element about the groove for holding the same to the spoon type fishing bait.

References Cited in the file of this patent

UNITED STATES PATENTS

| | | |
|---|---|---|
| 2,271,899 | Miller | Feb. 3, 1942 |
| 2,470,381 | Valentino | May 17, 1949 |
| 2,821,045 | Shabarick | Jan. 28, 1958 |
| 2,841,911 | Dahlgren | July 8, 1958 |
| 2,947,053 | Sanderson | Aug. 2, 1960 |

FOREIGN PATENTS

| | | |
|---|---|---|
| 587,043 | Canada | Nov. 17, 1959 |